(12) United States Patent
Tanabe

(10) Patent No.: US 8,478,101 B2
(45) Date of Patent: Jul. 2, 2013

(54) RECORDING APPARATUS

(75) Inventor: Akihiro Tanabe, Minato-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1679 days.

(21) Appl. No.: 11/466,212

(22) Filed: Aug. 22, 2006

(65) Prior Publication Data
US 2007/0047908 A1 Mar. 1, 2007

(30) Foreign Application Priority Data
Aug. 31, 2005 (JP) ................. 2005-252907

(51) Int. Cl.
*H04N 5/765* (2006.01)
(52) U.S. Cl.
USPC ........................................ 386/200
(58) Field of Classification Search
USPC ............................................. 386/46
See application file for complete search history.

(56) References Cited

U.S. PATENT DOCUMENTS

2005/0134689 A1* 6/2005 Hatanaka .................... 348/207.1
2007/0172212 A1* 7/2007 Miyagawa .................... 386/125

FOREIGN PATENT DOCUMENTS

JP 2001-167558 A 6/2001

* cited by examiner

*Primary Examiner* — William C Vaughn, Jr.
*Assistant Examiner* — Daniel Tekle
(74) *Attorney, Agent, or Firm* — Canon USA Inc IP Division

(57) ABSTRACT

A recording apparatus includes a recording unit which records image data to a recording medium or reproduces image data from the recording medium, and a control unit which enables a first control mode for controlling the recording unit in response to a request from an external device if the apparatus can communicate with the external device, and disables the first control mode and enables a second control mode for controlling the recording unit in response to a request from a user. If the first control mode is disabled and the second control mode is enabled, the control unit determines whether a state of the recording medium is changed. If the state of the recording medium is changed, the control unit controls the recording unit so as to read the recording medium.

16 Claims, 8 Drawing Sheets

FIG. 8

| Bit<br>Byte | 7 | 6 | 5 | 4 | 3 | 2 | 1 | 0 | |
|---|---|---|---|---|---|---|---|---|---|
| 0 | colspan="8" | Operation code (A1h) | | | | | | | ~801 |
| 1 | colspan="3" | LUN(Obsolete) | | | Immed | Reserved | colspan="3" | Blanking Type | | | ~802 |
| 2 | colspan="8" | (MSB) | | | | | | | |
| 3 | colspan="8" | Start Address or Track/RZone Number | | | | | | | |
| 4 | colspan="8" | | | | | | | | |
| 5 | colspan="8" | (LSB) | | | | | | | |
| 6 | colspan="8" | Reserved | | | | | | | |
| 7 | colspan="8" | Reserved | | | | | | | |
| 8 | colspan="8" | Reserved | | | | | | | |
| 9 | colspan="8" | Reserved | | | | | | | |
| 10 | colspan="8" | Reserved | | | | | | | |
| 11 | Vendor-Specific | colspan="4" | Reserved | | | | NACA | Flag | Link | |

FIG. 9

| Bit<br>Byte | 7 | 6 | 5 | 4 | 3 | 2 | 1 | 0 | |
|---|---|---|---|---|---|---|---|---|---|
| 0 | Operation code (1Bh) | | | | | | | | ~901 |
| 1 | LUN(Obsolete) | | | Reserved | | | | Immed | |
| 2 | Reserved | | | | | | | | |
| 3 | Reserved | | | | | | | | |
| 4 | Power Condition | | | | Reserved | | LoEj | Start | ~902 |
| 5 | Vendor-Specific | Reserved | | | | NACA | Flag | Link | |
| 6 | PAD | | | | | | | | |
| 7 | | | | | | | | | |
| 8 | | | | | | | | | |
| 9 | | | | | | | | | |
| 10 | | | | | | | | | |
| 11 | | | | | | | | | |

RECORDING APPARATUS

BACKGROUND OF THE INVENTION

1. Field of the Invention

The present invention relates to a recording apparatus which can record or write digital data such as image data to a recording medium.

2. Description of the Related Art

Conventionally, data of moving images taken by a digital video camera are recorded to a magnetic tape. In recent years, digital video cameras that record such data to optical disks such as the Digital Versatile Disk (DVD) have been proposed (refer to FIG. 1 of Japanese Patent Application Laid-Open No. 2001-167558).

In the case where a digital video camera using an optical disk as a recording medium is connected to a personal computer (PC), the digital video camera operates as an external storage device of the PC. In such a case, the contents of the optical disk loaded in the digital video camera do not have to be known.

On the other hand, when the digital video camera is disconnected from the PC, the digital video camera operates as a digital video camera instead of as an external storage device of the PC. Therefore, it becomes necessary to know the contents of the inserted optical disk.

However, the optical disk needs to be reread when the digital video camera is disconnected from the PC in such a configuration. Therefore, much time is consumed until the digital video camera becomes usable as a digital video camera after it is disconnected from the PC.

SUMMARY OF THE INVENTION

The present invention is directed to overcoming the above-described drawbacks. For example, the present invention can reduce unnecessary access to the recording medium if the recording apparatus such as a digital video camera is disconnected from an external device such as a PC.

According to an aspect of the present invention, a recording apparatus includes a recording unit configured to record image data to a recording medium or reproduces image data from the recording medium; and a control unit configured to enable a first control mode for controlling the recording unit in response to a request from an external device if the apparatus can communicate with the external device, and disable the first control mode and enable a second control mode for controlling the recording unit in response to a request from a user if the apparatus cannot communicate with the external device, wherein if the control unit disables the first control mode and enables the second control mode, the control unit determines whether a state of the recording medium is changed, and wherein if the control unit determines that the state of the recording medium is changed, the control unit controls the recording unit so as to reads the recording medium.

According to another aspect of the present invention, a method is provide which may be performed in a recording apparatus for reducing unnecessary access to a recording medium when the recording apparatus is disconnected from an external device, the recording apparatus including a recording unit configured to record image data to a recording medium or reproduces image data from the recording medium; and a control unit configured to enable a first control mode for controlling the recording unit in response to a request from an external device if the apparatus can communicate with the external device, and disable the first control mode and enable a second control mode for controlling the recording unit in response to a request from a user if the apparatus cannot communicate with the external device. The method includes determining whether a state of the recording medium is changed if the control unit disables the first control mode and enables the second control mode; and controlling the recording unit so as to read the recording medium if the control unit determines that the state of the recording medium is changed.

According to another aspect of the present invention, a computer readable medium is provided containing computer-executable instructions to be performed in a recording apparatus for reducing unnecessary access to a recording medium when the recording apparatus is disconnected from an external device, the recording apparatus including a recording unit configured to record image data to a recording medium or reproduces image data from the recording medium; and a control unit configured to enable a first control mode for controlling the recording unit in response to a request from an external device if the apparatus can communicate with the external device, and disable the first control mode and enable a second control mode for controlling the recording unit in response to a request from a user if the apparatus cannot communicate with the external device. The computer readable medium includes computer-executable instructions for determining whether a state of the recording medium is changed if the control unit disables the first control mode and enables the second control mode; and
computer-executable instructions for controlling the recording unit so as to read the recording medium if the control unit determines that the state of the recording medium is changed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features and aspects of the present invention and, together with the description, serve to explain the principles of the present invention.

FIG. 8 is a configuration example of a BLANK command. according to an exemplary embodiment of the present invention FIG. 9 is a configuration example of a START STOP UNIT command according to an exemplary embodiment of the present invention.

DETAILED DESCRIPTION OF THE EMBODIMENTS

Exemplary embodiments, features and aspects of the present invention will now be herein described in detail below with reference to the drawings.

Figure 1:
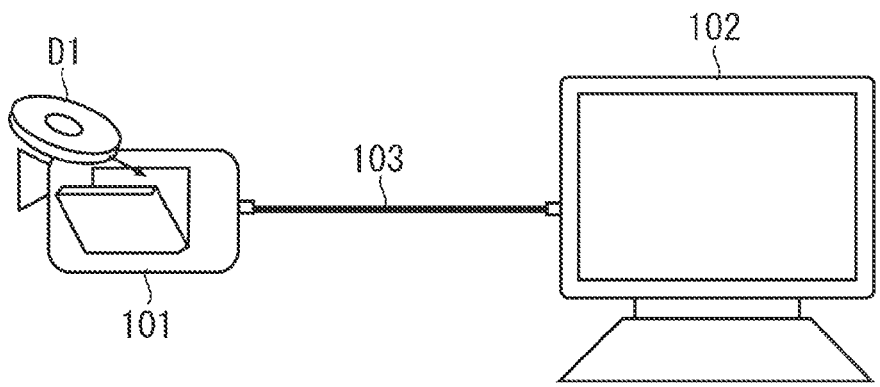
FIG. 1 shows an example configuration of a digital video camera system according to an exemplary embodiment of the present invention.

FIG. 1 shows an example configuration of a digital video camera system including a digital video camera 101 which is a recording and reproducing apparatus according to an exemplary embodiment of the present invention. The system is configured of a digital video camera 101 and a personal computer (PC) 102 as an example of an external device. The digital video camera 101 records the captured image data to an optical disk (also referred to as a disk medium) D1 such as a DVD-RAM (8 cm) or reproduces image data selected by a user from the optical disk D1. The optical disk D1 is an example of a recording medium, so the digital video camera 101 can uses other type of the recording medium instead of the optical disk D1.

The digital video camera 101 and PC 102 are connected through a network which utilizes a communication protocol, for example Universal Serial Bus (USB), or any other similar communications protocol standard, so as to communicate with each other. To be more precise, both the digital video camera 101 and PC 102 have USB interfaces, and transmission of data including image data is realized by connecting a USB cable 103 to the USB interfaces. The present exemplary embodiment describes a case where the Mass Storage class is used as the transmission protocol of the USB to transmit the data between the digital video camera 101 and PC 102. That is, the digital video camera 101 is recognized as a drive by the PC 102.

Figure 2:
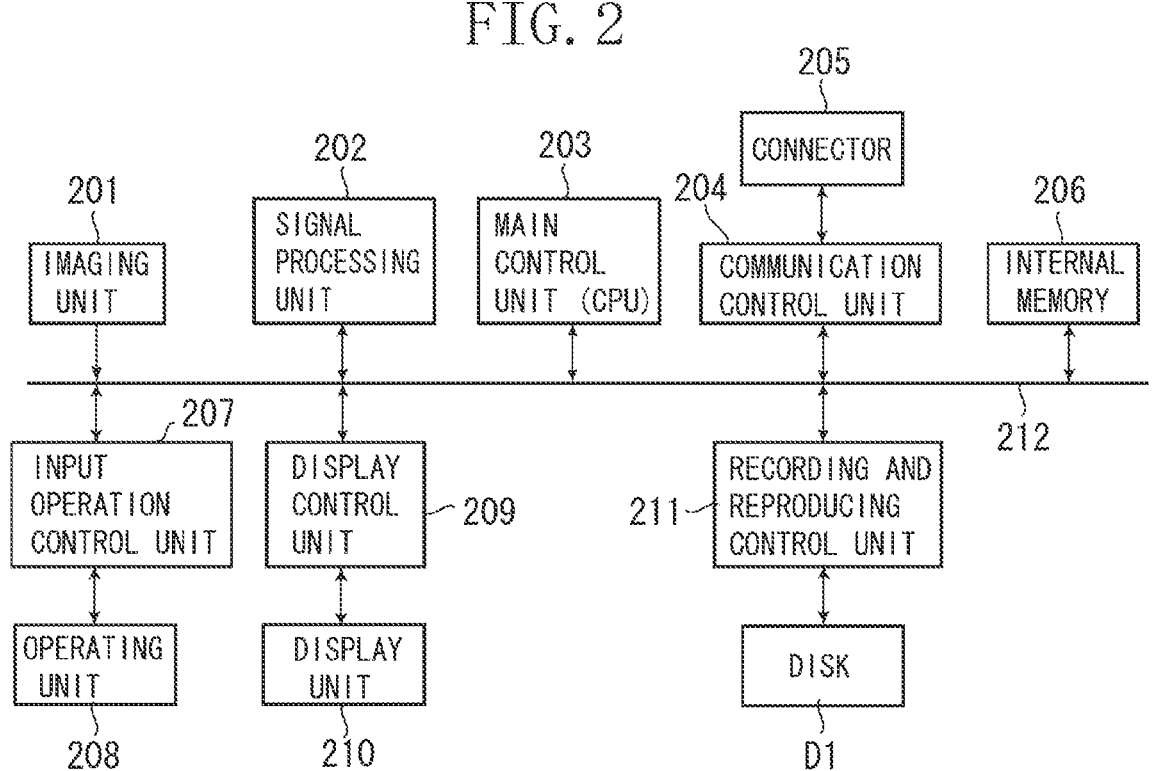
FIG. 2 is a block diagram of an example digital video camera according to an exemplary embodiment of the present invention.

FIG. 2 is a block diagram of the typical components of the digital video camera 101. The imaging unit 201 takes the image of an object, generates the moving image data, and outputs the generated data to the bus 212. In recording the image data, the signal processing unit 202 encodes the moving image data outputted from the imaging unit 201 through the bus 212 by a predetermined encoding method and outputs the encoded data to the recording and reproducing control unit 211. In reproducing the image data, the signal processing unit decodes the moving image data reproduced from the disk D1 by the recording and reproducing control unit 211 and outputs the decoded data to the display control unit 209.

The main control unit 203 is connected to each constituent component in the digital video camera 101 through the bus 212, and controls and directs each constituent component through the software running on the main control unit 203. The transmission control unit 204 controls the communication in accordance with the Mass Storage standard in the case where it is connected to an external device, that is, the PC 102 in FIG. 1, by a USB cable 103 through a USB device connector 205. The internal memory 206 stores the various software (computer programs) used by the main control unit 203 or the various information sent from PC 102.

The input operation control unit 207 discriminates the key information input by the user into the operation unit 208 and notifies the key information to the software running on the main control unit 203. The display control unit 209 generates the image to be displayed on the display unit 210 and controls the display based on the moving image data outputted from the signal processing unit 202.

The recording and reproducing control unit 211 records the data of the captured image to the optical disk D1 and reproduces the data from the optical disk D1. In addition, the recording and reproducing control unit 211 controls the transfer of the read data to the internal memory 206. The data read and transferred to the internal memory 206 is either sent to an external device (PC102) through the communication control unit 204 or transferred to the display unit 210 through the display control unit 209.

Figure 3:
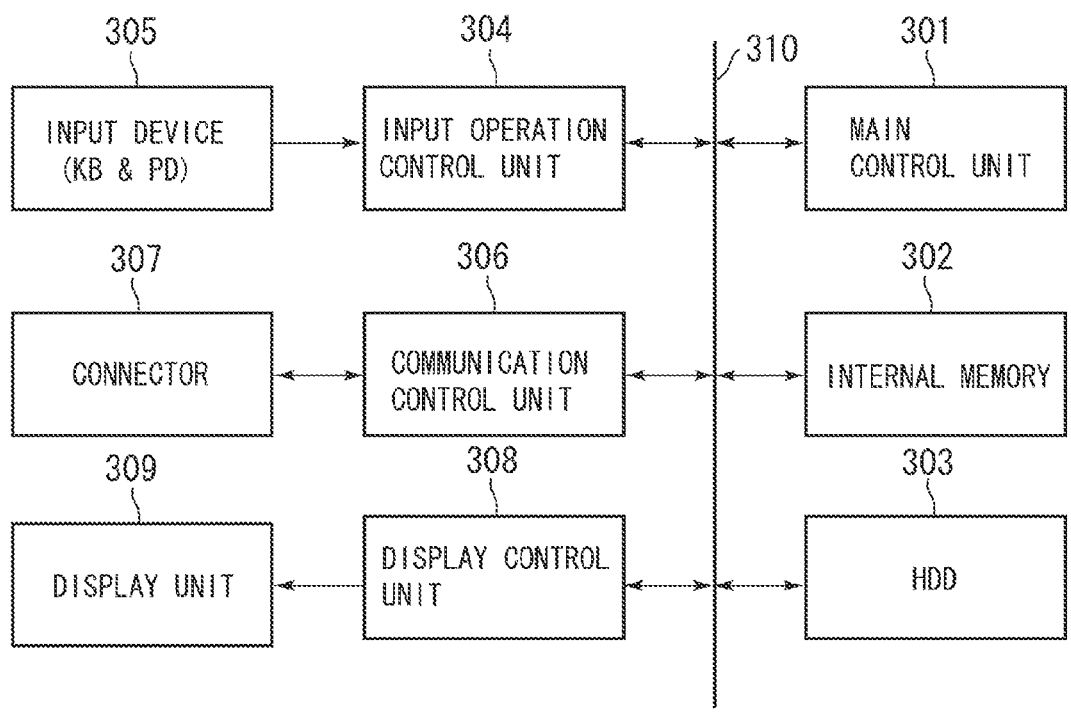
FIG. 3 is a block diagram of a personal computer according to an exemplary embodiment of the present invention.
Figure 5:
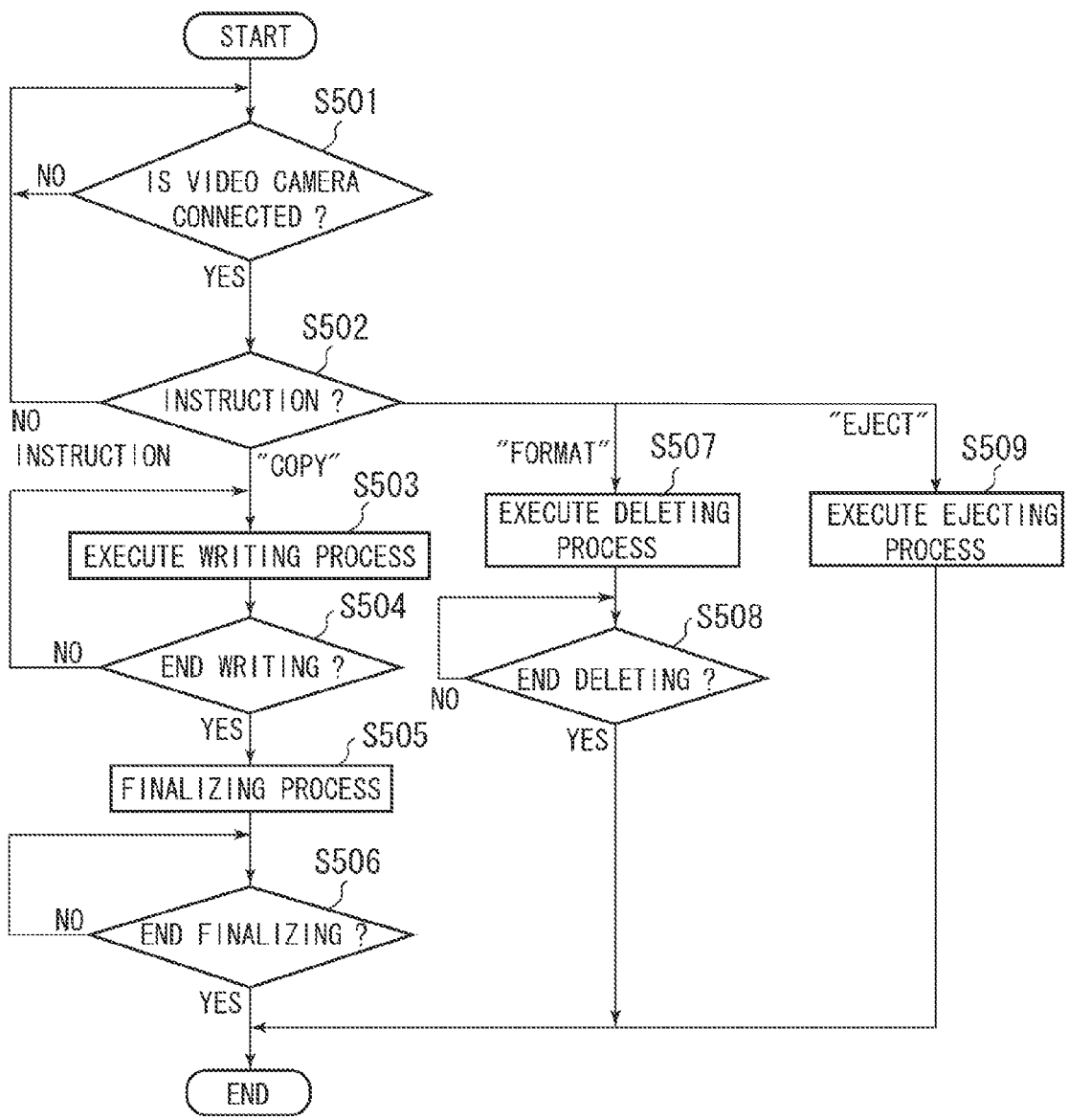
FIG. 5 is a flowchart of an example of the process executed by the DVC control application according to an embodiment of the present invention.
Figures 6, 7:
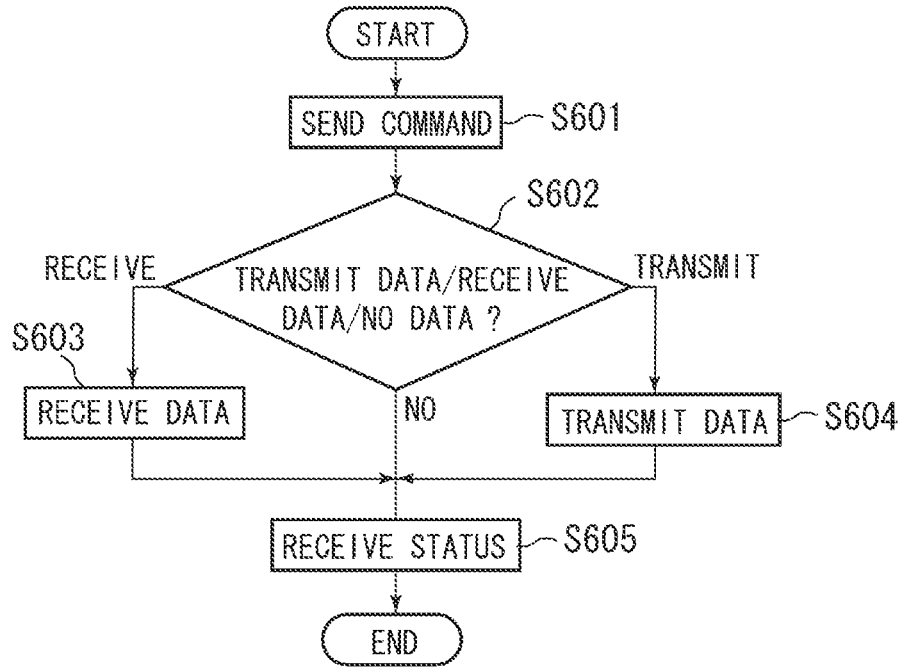
FIG. 6 is a flowchart of an example command transmission process according to an exemplary embodiment of the present invention.
FIG. 7 is a configuration example of a WRITE10 command according to an exemplary embodiment of the present invention.

FIG. 3 is a block diagram of an exemplary PC 102. The main control unit 301 is configured by a CPU and controls the entire device (PC 102). The internal memory 302 stores the operating system (OS) loaded from the hard disk drive (HDD) 303 as well as various application programs. The main control unit 301 (CPU) reads and runs these OS and the various application programs as deemed appropriate so as to realize the processes as shown in FIG. 5 and FIG. 6 which are described later. The HDD 303 stores the OS and the various application programs including the DVC control application to be used in the present exemplary embodiment.

The input operation control unit 304 receives input from the input device 305 which includes a pointing device (PD) such as a mouse, or a key board (KB), and outputs the key information indicating the key operation to the main control unit 301. The communication control unit 306 controls the communication in the data transmission and receipt between the PC 102 and the digital video camera 101 connected by the USB cable 103 through the USB host connector 307. The display control unit 308 outputs the video signals to the display unit 309 such as a CRT or a liquid display device or performs rendering on the internal video memory in response to a request from the main control unit 301. The data bus 310 is used for data transmission and receipt between the functional blocks inside the PC 102.

Exemplary DVC Control Application

An exemplary DVC control application installed in the PC 102 is described as follows. The DVC control application is an application software for controlling the digital video camera 101 and is stored in the HDD 303.

Figure 4:
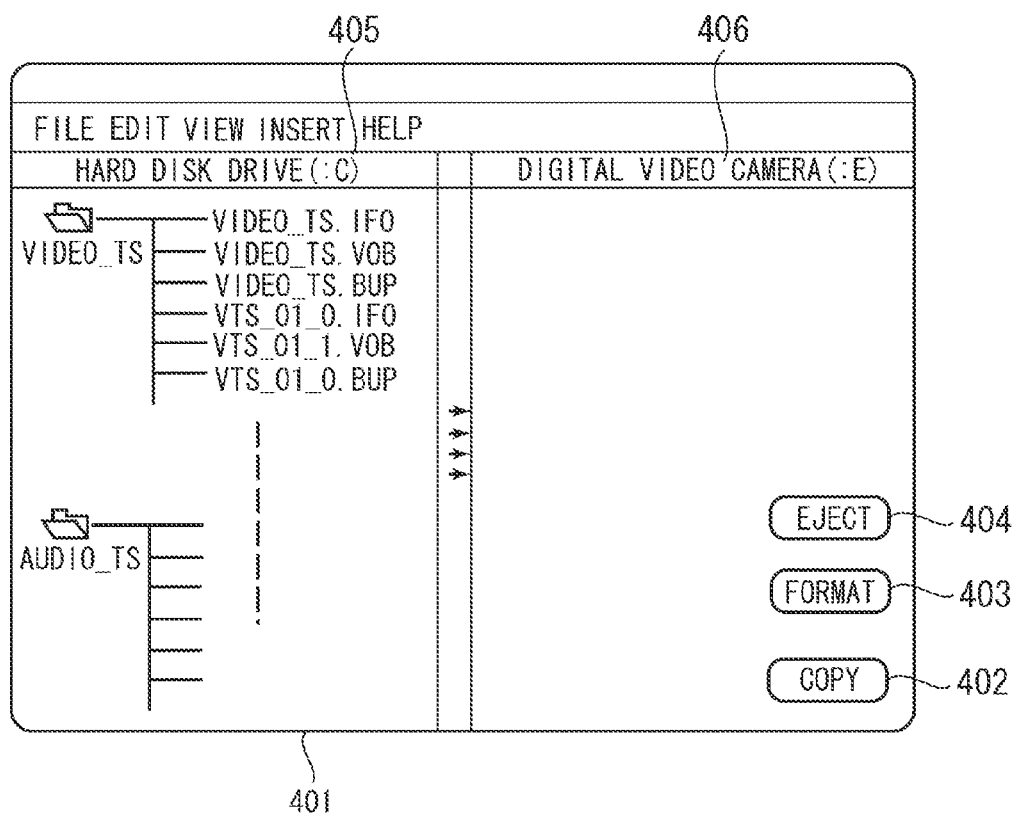
FIG. 4 shows an example of an user interface of the DVC control application which controls the digital video camera according to an embodiment of the present invention.

FIG. 4 is an example of an user interface of the DVC control application. The user interface 401 is an interface for inputting operations such as copying data, or formatting or ejecting a disk (i.e., a recording medium). The copy button 402 is a button for copying the data stored in the reading source 405 (or HDD 303 in the example shown in FIG. 4) to the writing location 406 (or disk D1 in the digital video camera 101 in the example shown in FIG. 4). The format button 403 is a button for requesting the formatting of the disk D1 inserted in the digital video camera 101 which is the writing location 406. The eject button 404 is a button for requesting the ejecting of the disk D1 inserted in the digital video camera 101 (i.e., the writing location 406).

FIG. 5 is a flowchart of an exemplary process executed by the DVC control application. In step S501, the main control unit 301 checks whether the digital video camera 101 is connected though a network. In the case where the digital video camera 101 is connected ("YES" in step S501), the process proceeds to step 502. In the case where it is not connected ("NO" in step S501), the process returns to step S501 to determine whether the digital video camera 101 is connected.

To be more precise, when a device supporting USB is connected by the USB cable 103 through the connector 307, a connection signal is sent to the communication control unit 306 through the connector 307. The connection signal is further sent by the communication control unit 306 to the main control unit 301. When such notification is received, the main control unit 301 obtains the information about the device connected to the connector 307, namely the descriptor structure that is in compliance with USB. As a result, the main control unit 301 can determine whether the desired digital video camera 101 is connected through the connector 307.

In step S502, the main control unit 301 determines whether a user has selected the copy button 402, the format button 403, or the eject button 404 when the digital video camera 101 is connected by the USB cable 103 through the connector 307.

When the user presses one of the copy button 402, format button 403, or eject button 404 through the input device 305, the KEY information is input into the input operation control unit 304 by the input device 305. Furthermore, the main control unit 301 is notified of the KEY information. The main control unit 301 determines which button is pressed by referring to the present state and the pressed KEY information.

The process proceeds to step S503 when the copy button 402 is pressed, or to step S507 when the format button 403 is pressed, or to step S509 when the eject button 404 is pressed. If the KEY information is not sent from the input device 305 through the input operating control unit 304, the main control unit 301 determines that none of the buttons 402, 403, 404 is pressed and returns to step S501 to confirm whether the digital video camera is connected.

Exemplary Copying Process

An exemplary process in the case where it is determined that the copy button 402 is pressed and the process proceeds to step S503, is described first. In step S503, the main control unit 301 issues a WRITE10 command (a write command), which is stipulated in the ATAPI (AT Attachment Packet Interface) standard, through the communication control unit 306 and the connector 307. By doing so, the main control unit 301 instructs the digital video camera 101 to write the data to the optical disk D1.

With reference to FIG. 6, the case is described where an ATAPI command is executed by a Mass Storage standard (Mass Storage Class) of USB. FIG. 6 is a flowchart of the command transmission from the PC 102 in the present exemplary embodiment. For the sake of convenience, the section which issues the ATAPI command is referred to as the host and the section which receives the ATAPI command is referred to as the device in this figure.

In step S601, the host sends the command in the ATAPI command format by placing the command inside a data structure of Mass Storage called the Command Block Wrapper (CBW). In step S602, the host proceeds to step S603 if the command format is a command for obtaining the status, and to step S604 if it is a command for transmitting data. The host proceeds to step S605 if there is no data to be transmitted or received, and determines whether the command is successful.

In step S603, a data of a predetermined data structure is sent from the device that obtained the command, and the data is received by the host. In step S604, the host sends the data to the device using a command such as WRITE10 for writing. In step S605, the device sends data to the host using a data structure called Command Status Wrapper (CSW) in the Mass Storage standard to inform whether the command was successful. The host receives the CSW and determines whether the command has succeeded.

Returning to step S503 in FIG. 5, the memory control unit 301 issues the WRITE10 command of the ATAPI standard based on the Mass Storage protocol as described in FIG. 6. The command is issued by the main control unit 301 instructing that a CBW stored in the internal memory 302 should be sent from the communication control unit 306 through the connector 307. The issued command is received by the digital video camera 101 through the USB cable 103. After sending the WRITE10 command to the digital video camera 101, the main control unit 301 reads the data to be written to the optical disk D1 from the HDD 303 and sends the data to the digital video camera 101 from the communication control unit 305 through the connector 307. The data corresponding to the amount of sector designated by the WRITE10 command is sent by the main control unit 301 to the digital video camera 101, and the process proceeds to step S504.

In step S504, the main control unit 301 determines whether all of the data designated by the DVC control application to be sent from the reading source 405, are sent to the digital video camera 101 (i.e., the writing location 406). In the case where all of the data are not sent ("NO" in step S504), the process returns to step S503. In the case where all of the data are sent ("YES" in step S504), the process proceeds to step S505.

In step S505, the main control unit 301 causes the digital video camera 101 to conduct the finalizing process after the writing has finished. The finalizing process is conducted when a CLOSE command of the ATAPI standard is issued to the digital video camera, and the process proceeds to step S506.

In step S506, the main control unit 301 conducts polling using a TEST UNIT READY command of the ATAPI standard to detect whether the finalizing process in the digital video camera 101 has ended. In the case where an error message in a CSW is not returned after issuing the TEST UNIT REASY command ("YES" in step S506), the main control unit 301 determines that the finalizing process has ended and ends the copying process. Otherwise ("NO" in step S506), step S506 is reperformed until the main control unit 301 determines that the finalizing process has ended.

Exemplary Formatting Process

The following exemplary formatting process is conducted in the case where it is determined that the FORMAT button 403 is pressed and the process proceeds to step S507. In step S507, the main control unit 301 issues a BLANK command of the ATAPI standard to the digital video camera 101 to format the optical disk D1 in the digital video camera 101. To be more precise, in response to an instruction from the main control unit 301, the BLANK command is sent to the digital video camera 101 through the communication control unit 306, the connector 307, and the USB cable 103. After sending the BLANK command, the main control unit 301 receives a CSW and proceeds to step S508.

In step S508, the main control unit 301 conducts polling using the TEST UNIT READY command of the ATAPI standard to determine whether the formatting by a deleting operation in the digital video camera 101 has ended, similarly as in step S506. The main control unit 301 conducts polling using this command until an error message is not returned in the CSW. In the case an error message is not returned ("YES" in step S508), the memory control unit 301 determines that the formatting has ended and ends the process. Otherwise ("NO" in step S508), step S508 is reperformed until the main control unit 301 determines that the formatting process has ended.

It is noted that the above embodiment describes the case where a BLANK command is used in the formatting process. However, a FORMAT UNIT command can also be used.

Exemplary Ejecting Process

Next, the case is described where it is determined that the eject button 404 is pressed and the process proceeds to step S509. The START STOP UNIT command of the ATAPI standard is used in ejecting the optical disk (recording medium) D1 inserted in the digital video camera 101.

In step S509, the main control unit 301 issues a START STOP UNIT command of the ATAPI standard to the digital video camera 101 to eject the optical disk D1 in the digital video camera 101. To be more precise, in response to an instruction from the main control unit 301, the START STOP UNIT command is sent to the digital video camera 101 through the communication control unit 306, the connector 307, and the USB cable 103. After sending the command, the main control unit 301 receives a CSW and ends the ejecting process.

The WRITE10 command, BLANK command, and START STOP UNIT command of the ATAPI standard are described with reference to FIG. 7, FIG. 8, and FIG. 9.

FIG. 7 shows a configuration example of the WRITE10 command. Field 701 is afield for inputting the Operation Code, and the value "2Ah" is input to indicate that the command is a WRITE10 command. Field 702 is a field for the logical address for writing the data. Field 703 is a field for indicating the length of the data to be sent. In the case of a DVD media, the field 703 is used to designate the number of sectors.

FIG. 8 is a configuration example of the BLANK command. Field 801 is used for inputting the Operation Code, and the value "A1h" is input to indicate that the command is a BLANK command. Field 802 designates the type of formatting, and Blanking Type is input. For example, in the case where all data is to be formatted, "000b (Blank the Disc)" is input into Field 802, and in the case where a simplified deletion is to be conducted, "001b (Minimally blank the disc)" is input into Field 802.

FIG. 9 shows a configuration example of the START STOP UNIT command. Field 901 is used for inputting the Operation Code, and the value "1Bh" is input to indicate that the command is a START STOP UNIT command. Field 902 is a field for designating an eject instruction or a load instruction by combining Power Condition, LoEj, and Start. When Power Condition is "0h", LoEj is "1b", and Start is "0b", the eject instruction is executed.

Exemplary Digital Video Camera Operation

The operation of the digital video camera in the present exemplary embodiment is described as follows. The digital video camera 101 in the present exemplary embodiment has a PC mode, a camera mode, and a reproducing mode as the operating states. The PC mode is an operating mode in the case where the digital video camera 101 and the PC 102 are connected through the USB cable 103 (i.e., the digital video camera 101 is connected to a network), in which the processing in response to the instruction (request) from the PC 102 is performed.

The camera mode and the reproducing mode are operating modes in the case where the digital video camera 101 is not connected to the PC 102 through the USB cable 103 (i.e., the digital video camera 101 is not connected to the network), in which the processing is performed in response to the instruction (request) input into the digital video camera 101 by a user. When the camera mode is selected, the moving image data obtained by taking an image of an object can be recorded to the optical disk D1. When the reproducing mode is selected, the moving image data selected by a user manipulating the user interface of the digital video camera 101 is reproduced from the optical disk D1 by the digital video camera 101, and the reproduced data can be displayed on the display unit 210.

When the digital video camera 101 is not connected to the PC 102 through the USB cable 103 (i.e., it is not connected to the network), the camera mode and the reproducing mode can be selected using a switch on the digital video camera 101. When the digital video camera 101 is connected to the PC 102 through the USB cable 103 while the reproducing mode is selected, the operating mode changes automatically to the PC mode. In addition, when the digital video camera 101 is disconnected from the PC 102 (i.e., disconnected from the network), the operating mode changes automatically to the reproducing mode.

The digital video camera 101 runs different program modules corresponding to each of the above modes to perform the processes. In the present exemplary embodiment, the processes are performed in the following module structure.

Module A: A program module for the PC mode

Module B: A program module for the reproducing mode

Module B is the main module which operates in the reproducing mode. Module A is activated by the Module B and operates when the digital video camera 101 is connected to the PC 102. Module B stands by until the digital video camera 101 is disconnected from the PC 102 and module A stops. Each module will now be described in greater detail.

Exemplary Module A

Figure 10:
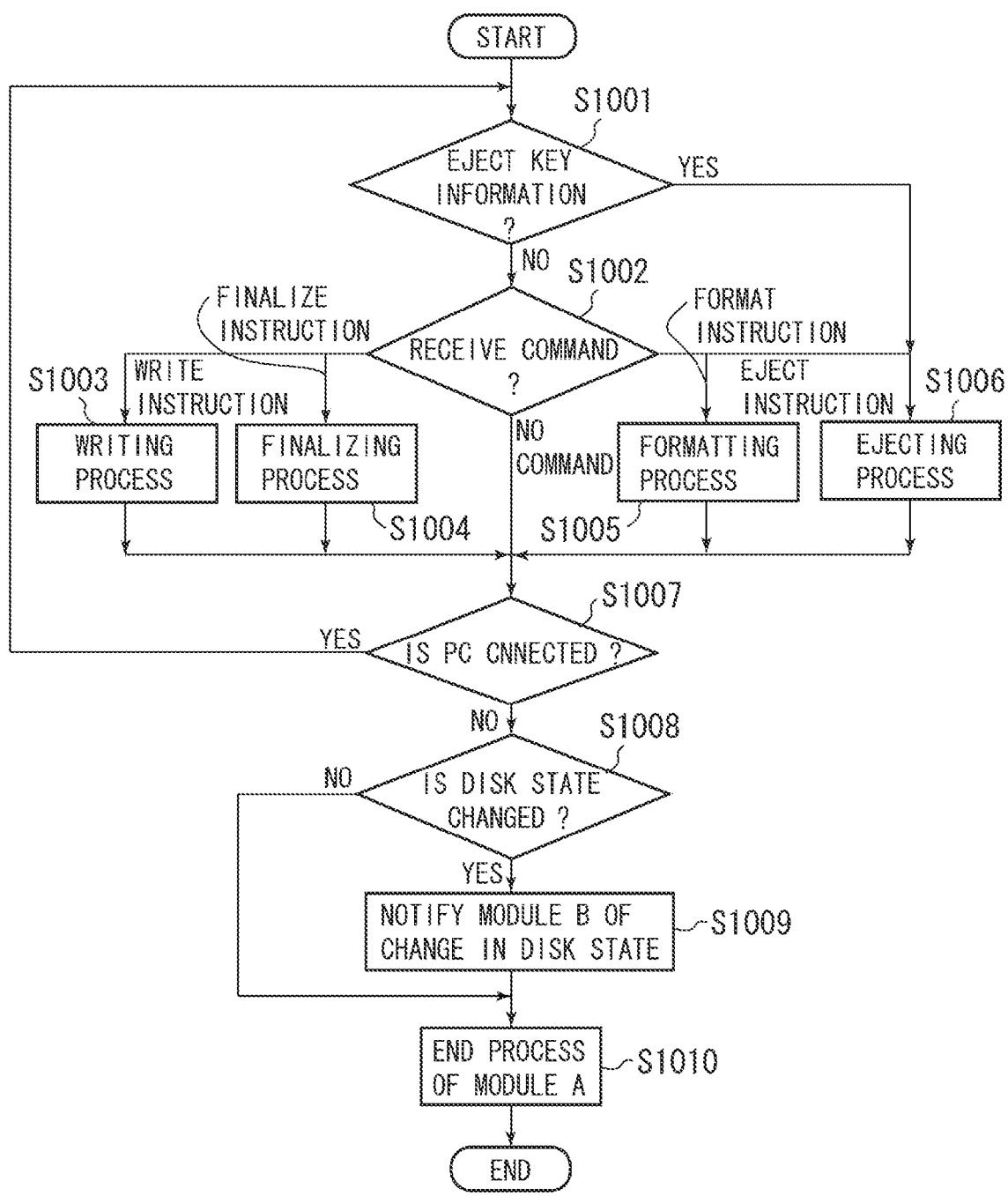
FIG. 10 is a flowchart of an example process in the digital video camera according to an exemplary embodiment of the present invention.

FIG. 10 is a flowchart of an exemplary process performed by module A. Module A is a module generated by module B, as will be described later. In step S1001, the main control unit 203 determines whether there is a notification of the EJECT KEY information from the operating unit 208 through the input operation control unit 207. When there is the notification ("YES" in step S1001), the process proceeds to step S1006 and the ejecting process is performed. When there is no notification ("NO" in step S1001), the process proceeds to step S1002.

In step S1002, the main control unit 203 determines whether there is a command sent from the PC 102 through the USB cable 103. The command from the PC 102 is received by the communication control unit 204 through the USB cable 103 and connector 205, and notified to the main control unit 203. The command is received in a packet structure of CBW. The main control unit 203 checks the values of the operation codes such as field 701, 801, and 901 described above and determines the received type command. Based on the result, the main control unit 203 allocates a process according to each command.

To be more precise, in the case where a command such as WRITE10, WRITE 12, or SEND DVD STRUCTURE commands of the ATAPI standard that instruct writing on the optical disk D1, is received, the process proceeds to step 1003. In the case where a CLOSE command is received and a finalizing or closing process is to be performed, the process proceeds to step S1004. In the case where a BLANK command or a FORMAT UNIT command is received and formatting or deleting of the optical disk D1 is to be conducted, the process proceeds to step S1005. In the case where a START STOP UNIT command is received and the optical disk D1 is to be ejected, the process proceeds to step S1006. If no command is received, the process proceeds to step S1007.

In step S1003, after receiving the command, the main control unit 203 receives the data to be actually written, from the communication control unit 204 through the connector 205 and stores the received data in the internal memory 206. The main control unit 203 performs control so that the recording and reproducing control unit 211 writes the data stored in the internal memory 206 to the optical disk D1 according to the received instruction to write the data. After all of the data specified by the command are written in the optical disk D1, the main control unit 203 sets a disk state change flag, which is stored in the internal memory 206 and proceeds to step S1007.

In step S1004, the main control unit 203 sends the received a closing instruction to the recording and reproducing control unit 211 to execute the closing process including the finalizing process. After receiving the closing instruction, the recording and reproducing control unit 211 closes the optical disk D1. After the closing process is completed, the main control unit 203 sets the disk state change flag, which is stored in the internal memory 206 and proceeds to step S1007.

In step S1005, the main control unit 203 sends the formatting instruction to the recording and reproducing control unit 211 to perform the formatting process. After receiving the instruction, the recording and reproducing control unit 211 formats the optical disk D1. When the process is completed, the main control unit 203 sets the disk state change flag, which is stored in the internal memory 206 and proceeds to step S1007.

In step S1006, the main control unit 203 sends an ejecting instruction to the recording and reproducing control unit 211 to perform the ejecting process for taking out the optical disk D1 from the tray. After receiving the instruction, the recording and reproducing control unit 211 discharges the optical disk D1 from the tray. When the process is completed, the main control unit 203 sets the disk state change flag, which is stored in the internal memory 206 and proceeds to step S1007.

In step S1007, the main control unit 203 determines whether the PC 102 is connected through the communication control unit 204 and the connector 205. In the case where the PC 102 is connected ("YES" in step S1007), the process returns to step S1001, and in the case where the PC 102 is not connected ("NO" in step S1007), the process proceeds to step S1008.

In step S1008, the main control unit 203 determines whether the disk state change flag is set which is stored in the internal memory 206. In the case where the disk state change flag is set in steps S1003, S1004, S1005, and S1006, the disk state is changed, and the main control unit 203 proceeds to step S1009. In step S1009, the main control unit 203 sets a value in a disk state change parameter 1202 which is a parameter for notifying module B that the optical disk D1 needs to be reread because the disk state is changed, and then proceeds to step S1010.

Figure 12:
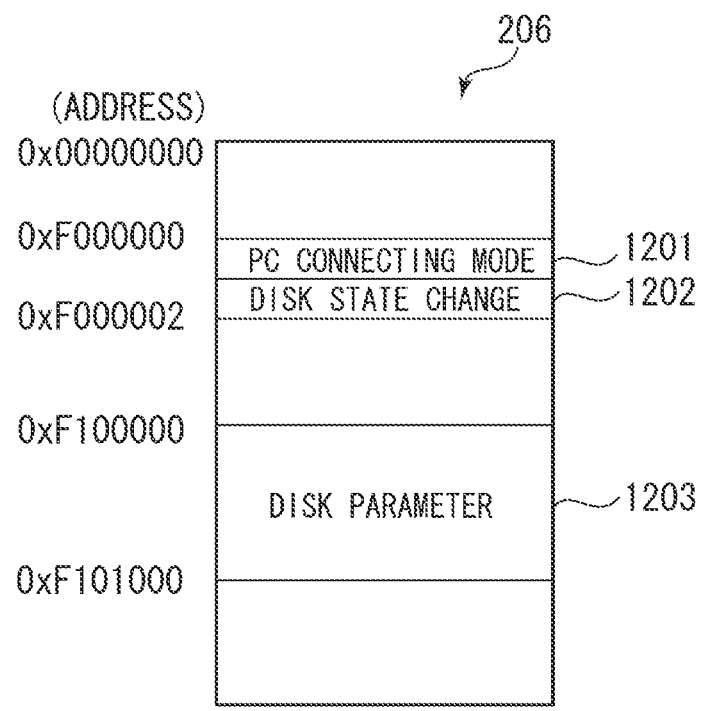
FIG. 12 shows an example of data stored in the internal memory of the digital video camera according to an exemplary embodiment of the present invention.

As shown in FIG. 12, the disk state change parameter 1202 is in the internal memory 206. On the contrary, if the disk state change flag is not set, the main control unit 203 determines that the disk state is not changed ("NO" in step S1008) and proceeds to step S1010 skipping step S1009.

In step S1010, the main control unit 203 clears the value of a PC connecting mode parameter 1201 in the internal memory 206 in order to delete module A itself and to notify module B of the completion of the PC mode. As shown in FIG. 12, the PC connecting mode parameter 1201 is in the internal memory 206. In addition, the main control unit 203 notifies module B that the PC mode has ended and ends the process of module A.

Exemplary Module B

Figure 11:
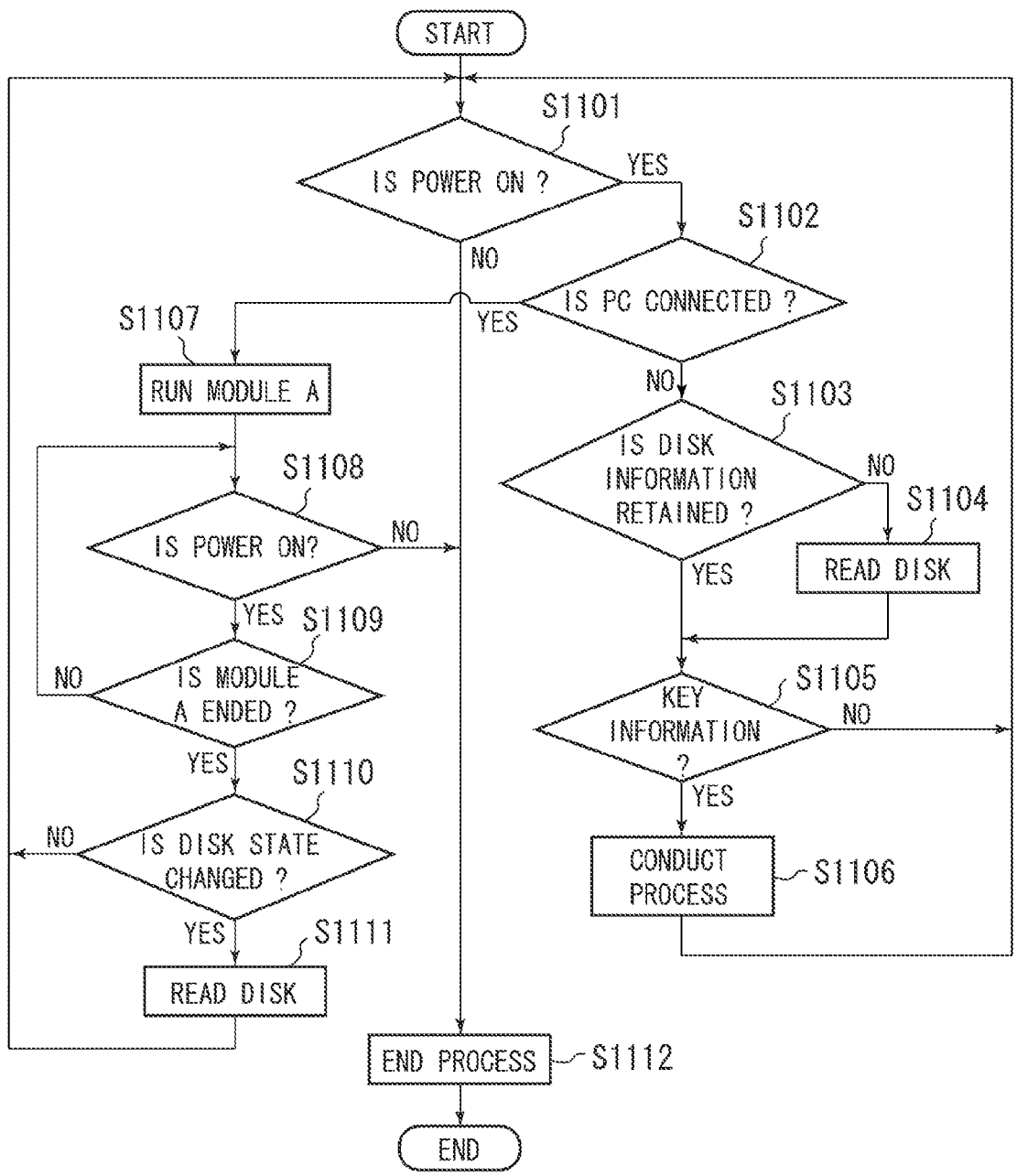
FIG. 11 is a flowchart of an example process in the digital video camera according to an exemplary embodiment of the present invention.

FIG. 11 is a flowchart of an exemplary process performed by module B. Module B is one of the main modules of the digital video camera 101, and operates when the digital video camera 101 is not connected to the PC 102. When the digital video camera 101 is connected to the PC 102, module B stands by until the process of module A ends.

In step S1101, the main control unit 203 determines whether the power is on based on the power KEY information sent from the operating unit 208 and the input operation control unit 207. In the case where the power is on ("YES" in step S1101), the process proceeds to step S1102; and in the case where the power is off ("NO" in step S1101), the process proceeds to step S1112 and the main control unit 203 ends the processes of module B. In step S1112, the main control unit 203 clears values in the PC connecting mode parameter 1201 and the disk state change parameter 1202 and deletes disk information in a disk parameter area 1203.

In step S1102, the main control unit 203 determines whether the PC 102 is connected based on the connection information notified through the connector 205 and the communication control unit 204. As a result, the process proceeds to step S1103 in the case where the PC is not connected ("NO" in step S1102), and to step S1107 in the case where the PC is connected ("YES" in step S1102).

In step S1103, the main control unit 203 checks whether the digital video camera 101 has obtained the disk information of the optical disk D1 and determines whether a rereading is necessary. For example, it is necessary to read the optical disk D1 to obtain the disk information when the power is switched on. However, after the disk D1 has been read once, it is not necessary to reread the optical disk D1 unless operations such as recording and formatting are to be performed. In the present exemplary embodiment, it can be determined whether disk information is already obtained, by searching a disk parameter area 1203 in the internal memory 206. As a result, if there is no disk information in the disk parameter area 1203 ("NO" in step S1103), the process proceeds to step S1104 to read the disk information. If the disk information exists in the disk parameter area 1203 ("YES" in step S1103), the process proceeds to step S1105 to use the disk information stored in the disk parameter area 1203.

The disk information includes information such as the type of medium of the optical disk (DVD-R, DVD-RW, DVD-RAM, CD-R, CD-RW), the type of writing format (VR, VIDEO), and whether finalization has been conducted. Further, the disk parameter includes information such as the logical address in which the moving image data is stored, the quality and image size of the recorded moving image data, the address in which the index information is stored, and the recordable disk capacity. When such disk information is obtained, index display, moving image reproduction, and moving image recording can be performed.

In step S1104, the main control unit 203 obtains the disk information of the optical disk D1 through the recording and reproducing control unit 211, and stores the disk information in the disk parameter are 1203. The disk information is obtained, by using a READ10 command (read command) of the ATAPI standard to access a predetermined logical address, from the UDF (Universal Disk Format) file system.

The type of medium is obtained by either READ DISC INFORMATION command or READ TRACK INFORMATION command depending on the information, and the recordable disk capacity is obtained by READ CAPACITY information. After obtaining the disk information from the optical disk D1 and storing it in the disk parameter area 1203, the main control unit 203 proceeds to step S1105.

In step S1105, the main control unit 203 determines whether there is a notification of KEY information from the operating unit 208 and the input operation control unit 207. As a result, if the KEY information is sent ("YES" in step S1105), the process proceeds to step S1106 and performs the process corresponding to the KEY information. If the KEY information is not sent ("NO" in step S1105), the process returns to step S1101 to confirm whether the power is on.

In step S1107, since the PC 102 is connected and the mode is shifted to the PC mode, the main control unit 203 executes module A as described above. In addition, the main control unit 203 sets a value in the PC connecting mode parameter 1201, and proceeds to step S1108.

Hereinafter, steps S1108 and S1109 are repeated while the PC is connected. In the present exemplary embodiment, steps S1108 and S1109 are performed in parallel with the processes as shown in FIG. 10.

In step S1108, the main control unit 203 checks whether the power is on as in step 1101. When the power is on ("YES" in step S1108), the process proceeds to S1109. When the power is off ("NO" in step S1108), the process proceeds to step S1112 and the main control unit 203 ends the processes of module A and module B. In step S1112, the main control unit 203 clears values in the PC connecting mode parameter 1201 and the disk state change parameter 1202 and deletes disk information in the disk parameter area 1203.

In step S1109, the main control unit 203 refers to the PC connecting mode parameter 1201 and determines whether the processing of module A has ended by disconnecting the digital video camera 101 from the PC 102. As a result, the process returns to step S1108 if module A is running ("NO" in step S1109). The process proceeds to step S1110 if module A has ended ("YES" in step S1109).

In step S1110, the main control unit 203 determines whether a value is set in the disk state change parameter 1202 when the processing of module A ends as described above. As a result, if the value is set in the disk state change parameter 1202 ("YES" in step S1110), it is necessary to reread the optical disk D1 so as to obtain the disk information from the optical disk D1, and the process proceeds to step S1111. In step S1111, the main control unit 203 sends a reread instruction to the recording and reproducing control unit 211 so as to perform the rereading of the optical disk D1. As a result of the rereading, the main control unit 203 obtains the disk information from the optical disk D1 and stores it in the disk parameter area 1203.

On the other hand, if a value is not set in the disk state change parameter 1202 ("NO" in step S1110), the process returns to step S1101. As an example, the case is described as follows where a digital video camera 101 is connected to the PC 102 by a USB cable 103 before switching on the digital video camera 101.

In such a case, the digital video camera 101 is expected to be operating in the PC mode by activating module A before reading the disk in the module B. That is, since the process returns immediately to step S1107 by way of steps S1101 and S1102, the digital video camera 101 switches to the PC mode without reading the disk information as in step S1104. In this case, unless the process to change the disk state such as loading, formatting, and disk swapping is performed in module A, a value will not be set in the disk state change parameter 1202 to which a reference is made in step S1110. As a result, the process returns to step S1101 without performing the disk reading process in step S1111, and the disk information is not retained in the disk parameter area 1203 in step S1101. After that, the process proceeds from step S1102 to step S1103. In step S1103, the disk information is not present in the disk parameter area 1203, and thus the process proceeds to step S1104. In step S1104, the disk information is obtained from the optical disk D1 and the disk information is stored in the disk parameter area 1203 as described above.

According to the present exemplary embodiment, when the PC mode is shifted to the reproducing mode, the processes of module A and module B are performed so that the state of the disk D1 which is a recording medium in the PC mode, is changed. Accordingly, control is possible such that, when the rereading of the disk is necessary, the rereading is conducted, and when it is not necessary, the rereading is not conducted. By doing so, unnecessary access to the disk D1 can be reduced, and excessive latency in the rereading of the disk D1 which conventionally cannot be avoided, can also be reduced when there is a shift from the PC mode to the reproducing mode. Therefore, the time required for the digital video camera 101 to be operational in shifting from the PC mode to the reproducing mode, is shortened, which improves the usability of the video camera.

Other Exemplary Embodiments

The above described exemplary embodiment can be realized by a computer program which can be executed in an apparatus or on a computer (CPU or MPU) of the system. In this case, the computer program is supplied to the apparatus or to the system through a computer readable recording medium. Such recording medium can be, for example, a flexible disk, hard disk, optical disk, magnetic optical disk, CD-ROM, magnetic tape, nonvolatile memory card, or ROM.

The computer program itself realizes the operations of the exemplary embodiment, and the computer program itself provides the present invention. In addition, in the case where the computer program realizes the operations of the above exemplary embodiment in collaboration with an operating system (OS) or other application software running on the computer, such computer program is considered to be an exemplary embodiment of the present invention.

In addition, in the case where the supplied computer program is stored in the memory equipped in a function enhancement board of the computer or a function enhancement unit connected to the computer, and the CPU in the function enhancement board or the function enhancement unit executes all or part of the processing based on the instructions of the computer program to realize the operations of the exemplary embodiment, the computer program is also included in the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2005-252907 filed Aug. 31, 2005, which is hereby incorporated by reference herein in its entirety.

What is claimed:
1. A recording apparatus comprising:
 a recording unit configured to record image data to a recording medium; and a control unit configured to (a) enable a first mode for controlling the recording unit in response to a request from an external device if the recording apparatus is connected with the external device, (b) determine that a state of the recording medium is changed if the request from the external device is received while the first mode is enabled, and (c) enable a second mode for controlling the recording unit in response to a request from a user if the recording apparatus is disconnected from the external device, wherein if the request from the external device is received while the first mode is enabled and the control unit determines that the state of the recording medium is changed, the control unit controls the recording unit to obtain recording medium information from the recording medium, the recording medium information including information relating to the recording medium, and wherein if the request from the external device is not received while the first mode is enabled and the control unit determines that the state of the recording medium is not changed, the control unit controls the recording unit not to obtain the recording medium information from the recording medium.

2. The recording apparatus according to claim 1, wherein the recording medium is a disk medium.

3. The recording apparatus according to claim 1, wherein if a formatting request for causing the recording apparatus to format the recording medium is received from the external device while the first mode is enabled, the control unit determines that the state of the recording medium is changed.

4. The recording apparatus according to claim 1, wherein if a write request for causing the recording apparatus to store data in the recording medium is received from the external device while the first mode is enabled, the control unit determines that the state of the recording medium is changed.

5. The recording apparatus according to claim 1, wherein if a finalizing request for causing the recording apparatus to perform a finalizing process is received from the external device while the first mode is enabled, the control unit determines that the state of the recording medium is changed.

6. The recording apparatus according to claim 1, wherein if an eject request for causing the recording apparatus to eject the recording medium is received from the external device while the first mode is enabled, the control unit determines that the state of the recording medium is changed.

7. A method of controlling a recording apparatus including a recording unit configured to record image data to a recording medium, the method comprising:

if the recording apparatus is connected with the external device, controlling the recording apparatus to enable a first mode for controlling the recording unit in response to a request from an external device;

controlling the recording apparatus to determine that a state of the recording medium is changed if the request from the external device is received while the first mode is enabled;

if the recording apparatus is disconnected from the external device, controlling the recording apparatus to enable a second mode for controlling the recording unit in response to a request from a user;

if the request from the external device is received while the first mode is enabled and the recording apparatus determines that the state of the recording medium is changed, controlling the recording unit to obtain recording medium information from the recording medium, the recording medium information including information relating to the recording medium; and if the request from the external device is not received while the first mode is enabled and the recording apparatus determines that the state of the recording medium is not changed, controlling the recording unit not to obtain the recording medium information from the recording medium.

8. The method according to claim 7, wherein the recording medium is a disk medium.

9. The method according to claim 7, further comprising:

if a formatting request for causing the recording apparatus to format the recording medium is received from the external device while the first mode is enabled, determining that the state of the recording medium is changed.

10. The method according to claim 7, further comprising:

if a write request for causing the recording apparatus to store data in the recording medium is received from the external device while the first mode is enabled, determining that the state of the recording medium is changed.

11. The method according to claim 7, further comprising:

if a finalizing request for causing the recording apparatus to perform a finalizing process is received from the external device while the first mode is enabled, determining that the state of the recording medium is changed.

12. The method according to claim 7, further comprising:

if an eject request for causing the recording apparatus to eject the recording medium is received from the external device while the first mode is enabled, determining that the state of the recording medium is changed.

13. The recording apparatus according to claim 1, wherein the recording apparatus is a digital video camera.

14. The method according to claim 7, wherein the recording apparatus is a digital video camera.

15. A non-transitory computer readable medium that stores a program for causing a computer act as the recording apparatus according to claim 1.

16. A non-transitory computer readable medium that stores a program for causing a computer to perform the method according to claim 7.

* * * * *